May 21, 1957 R. J. SCHILLER 2,792,782
MAGNETIC FIELD SENSITIVE APPARATUS
Filed March 30, 1950
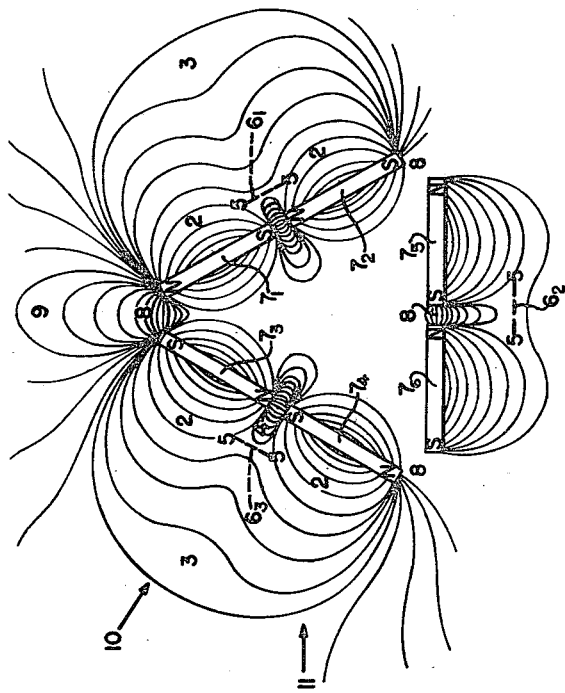
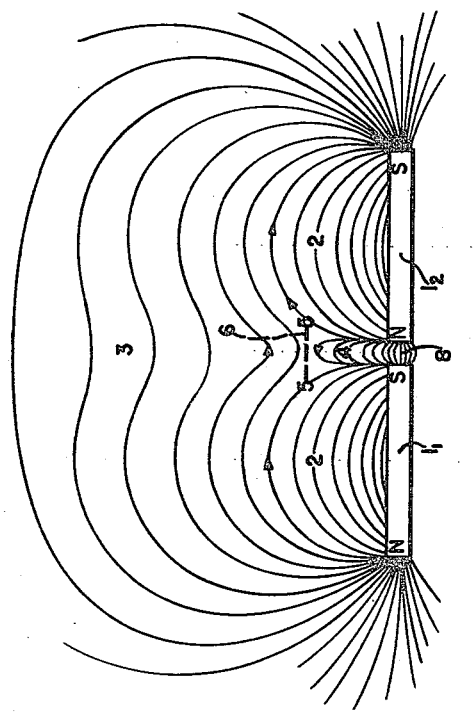
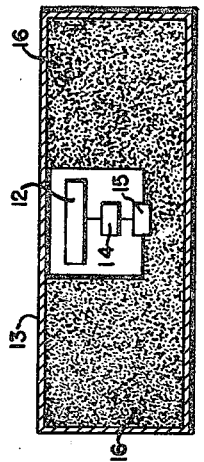
INVENTOR.
ROBERT J. SCHILLER

2,792,782

MAGNETIC FIELD SENSITIVE APPARATUS

Robert J. Schiller, Boston, Mass.

Application March 30, 1950, Serial No. 152,963

12 Claims. (Cl. 102—18)

(Granted under Title 35, U. S. Code (1952), sec. 266)

This invention relates in general to an apparatus for indicating the presence of magnetic materials and magnetic fields and, more specifically, to a novel mechanism for detecting the presence of magnetic materials and magnetic fields by distortion of a unified magnetic field effecting an unbalance of a region of zero field.

Heretofore, magnetic detectors have either been limited to detection of external fields by induction or by the external field affecting a magnetic needle indicator; or they have been limited to gradiometric devices that are based on the unbalance of one of two or more inherent fields by external influence. A detector of the type herein disclosed finds application whenever one wishes to detect, through distortion of the magnetic field of the detector itself, magnetic objects or external magnetic fields. For purposes of clarifying this discussion, reference is had to the problem of influence type mines in warfare. Influence type mines of magnetic nature are dependent for triggering action on the magnetic field of the target vessel itself. Mines counter-measures are therefore bent toward minimization of the vessel's field through various demagnetizing methods. Application of this invention to magnetic mines negates these countermeasures. The target vessel, regardless of the degree of demagnetization, will be detected by this invention which serves as a triggering mechanism for the mine detonator.

Accordingly, it is an object of this invention to provide means for detecting and indicating the presence of magnetic materials and magnetic influences by distortion of a unified magnetic field.

Another object of this invention is to provide a means for triggering a mine detonator by the influence of a target vessel on the field of the apparatus.

Other objects will become apparent from the following detailed description when taken with the accompanying drawings in which:

Fig. 1 represents an idealized cross-sectional view of a magnetic field configuration resulting from a linear array of two magnets;

Fig. 2 is a similar representation of an idealized cross-sectional view of a magnetic configuration resulting from a cyclic array of three binary magnetic arrays; and Fig. 3 is a cross-sectional diagram of an influence type underwater mine showing the installation therein of the detonator mechanism.

Referring now to Fig. 1, the magnetic field sources, such as the magnets or solenoids $1_1$ and $1_2$, are in a linear array such that poles of opposite polarity abut, such poles being separated by a dielectric substance 8, such as air. The field configuration thus resulting, as is well known to those versed in the art, will include internal fields 2 which are peculiar to the individual field source, an external field 3 which is common to both field sources, an interpolar field 4 immediately between the abutting poles, and a space of substantially zero magnetic field intensity 5. Arrows are used to indicate the conventional direction of magnetic flow showing that at space 5 all fields mutually cancel. At said space is located a detector 6, such as a magnetic needle, which is sensitive to magnetic field variations. Now, the presence of external influences such as other magnetic fields or ferromagnetic substances, even if those other fields are of such low intensity as to have no appreciable direct effect on the detector per se, will nevertheless cause some distortion of the external field 3. As the field vectors at space 5 are very strong and delicately balanced, this distortion of the external field will result in a variation in the strength of external field at space 5 and the space coordinates of space 5 will shift to readjust for the variation. The detector 6 is immediately affected by a combination of strong field intensities from fields 2, 3 and 4 at the old coordinates of space 5. The response by the detector to the shift thus indicates the presence of external influences such as a magnetic field. Thus, the device can be used to indicate the presence of magnetic materials.

Referring, now, to Fig. 2, which shows only part of a complete cross-section configuration, the magnetic field sources consist of binary linear arrays (herein called a two-element source) of smaller magnetic field sources such as solenoids or bar magnets $7_1$, $7_2$; $7_3$, $7_4$; and $7_5$, $7_6$. In a binary linear array, one pole of one magnet or solenoid abuts a pole of opposite polarity of the other magnet or solenoid, such poles being separated by a dielectric substance 8, such as air. These two-element sources are positioned in a cyclic array which in Fig. 2 is triangular for purposes of illustration. It is not to be supposed that this cyclic array is necessarily limited to the use of only three binary arrays. The field configuration in Fig. 2 differs from that of Fig. 1 in that there are three sensitive spaces of substantially zero magnetic field intensity 5, and field sections, herein called extra-polar fields 9, pertubations of which have little effect on said spaces 5. However, the more binary arrays introduced into the cyclic array, the less is the insensitivity due to the fields 9. Each binary array has a detector 6 such as a magnetic needle located in space 5. The binary arrays creating internal fields 2, external fields 3 and interpolar fields 4 are identical in those respects to the array in Fig. 1; and the presence of external influences such as other magnetic fields which cause some distortion of at least one of the multiple external fields 3 will be indicated by the detector of the array, whose field 3 is so distorted, as has been described in connection with Fig. 1.

Now, an external influence causing a distortion at a point 10, normal to the juncture of magnets $7_3$ and $7_4$ and in the same plane as the cyclic array, is indicated by a marked effect on the detector $6_3$; and, if the influence causes any distortion elsewhere in the whole field configuration of Fig. 2, it causes equal deflections of the detectors $6_2$ and $6_1$. An external influence causing a distortion at a point 11, however, which is slightly askew to a line normal to the juncture of magnets $7_1$ and $7_2$, is indicated most markedly by detector $6_3$, causes some smaller deflection by detector $6_2$ and causes the smallest deflection by detector $6_1$. In this manner, the direction of the external influence is qualitatively determined.

In Fig. 3, a magnetic materials indicator 12, such as in Fig. 1, is located within a mine casing 13. The presence of magnetic fields or magnetic materials external to the mine will be indicated by the detector in device 12, which is used as a switch to close the detonating circuit 14. The detonating circuit 14 fires the detonating material 15, such as a picrate or azide compound, which explodes the explosive material 16, such as cast TNT or Torpex. Using the magnetic materials indicator in such manner effectively creates a new type of influence underwater mine against which normal countermeasures are ineffective.

While particular embodiments of this invention have been described as required by the patent statutes, it will be obvious to those skilled in the art that changes and modifications may be made without departing from the invention and, therefore, it is the aim in the appended claims to cover but such changes and modifications as fall within the true spirit and scope of the invention.

The invention described herein may be manufactured and used by or for the Government of the United States of America for government purposes without the payment of royalty thereon or therefor.

What I claim is:

1. A magnetic device comprising, colinear magnetic means having adjacent regions of opposed polarity for establishing a nonuniform magnetic field enclosing space of substantially zero magnetic field intensity and means disposed in said space, said last-mentioned means being responsive to variations in magnetic field passing therethrough.

2. An apparatus capable of creating a split magnetic field with a configuration which includes a space of substantially zero magnetic field intensity, comprising at least two colinear bar magnets having adjacent ends of opposite polarity and a detector positioned at said space, said detector being responsive to distortions of said split magnetic field, said distortions resulting from external influence.

3. An apparatus consisting of three or more two-element magnetic field sources, said two-element sources consisting of two magnetic field sources in linear array, said first-mentioned sources being positioned in a cyclic array with poles of opposite polarity abutting, said sources creating a magnetic field configuration which includes spaces of substantially zero magnetic field intensity, and detectors positioned at said spaces, said detectors being responsive to distortions of said magnetic field, said distortions resulting from external influence.

4. An apparatus consisting of two magnets, said magnets being positioned in linear array such that one pole of one magnet abuts a pole of opposite polarity of the other magnet, both magnets being separated by a dielectric substance, said magnets creating a magnetic field configuration which includes a space of substantially zero magnetic field intensity, and a detector positioned in said space, said detector being responsive to distortions of said magnetic field, said distortions resulting from external influence.

5. An apparatus consisting of three or more two-element magnetic field sources, said two-element sources consisting of two magnets positioned in a linear array such that one pole of one magnet abuts a pole of opposite polarity of the other magnet, both magnets being separated by a dielectric substance, said sources being positioned in a cyclic array with poles of opposite polarity abutting and being separated by a dielectric substance, said sources creating a magnetic field configuration which includes spaces of substantially zero magnetic field intensity, and detectors positioned in said spaces, said detectors being responsive to distortions of said magnetic field, said distortions resulting from external influence.

6. A magnetic materials indicator comprising two magnets positioned in a linear array such that one pole of one magnet abuts a pole of opposite polarity of the other magnet, said magnets being separated by a dielectric substance, said magnets so disposed as to create a magnetic field configuration which includes a space of substantially zero magnetic field intensity, and a detector positioned in said space, such that the relative coordinates of said space are shifted when said magnetic field configuration is distorted by the presence of magnetic materials, said shift being indicated by said detector.

7. A magnetic materials direction indicator comprising three or more two-element magnetic field sources, said two-element sources consisting of two magnets in linear array, said magnets and said magnetic field sources being separated by a dielectric substance and having adjacently disposed ends of opposed polarity, said sources being positioned in cyclic array such that said sources create a magnetic field configuration which includes spaces of substantially zero magnetic field intensity, and detectors positioned in said spaces such that the relative coordinates of at least one of said spaces are shifted when said magnetic field configuration is distorted by the presence of magnetic materials, said shift being indicated by said detector.

8. An influence type mine comprising an explosive material in a mine casing and a detonating circuit being capable of detonating said explosive material, said circuit including a magnetic detector, said circuit being closed by a change of position of said detector, and two magnets being so positioned in linear array such that one pole of one magnet abuts a pole of opposite polarity of the other magnet, said magnets being separated by a dielectric substance, said magnets creating a field configuration including a space of substantially zero field magnetic intensity, said detector being positioned in said space.

9. A magnetic influence indicator comprising two substantially colinear magnetic field producing elements having substantially abutting ends of opposed polarity thereby providing a nonuniform magnetic field enclosing a region of zero magnetic field intensity wholly to one side of said colinear elements, and means responsive to variations of magnetic field intensity disposed within said region.

10. A magnetic influence indicator comprising a pair of bar magnets arranged to have a substantially abutting pair of poles of opposite polarity and a pair of widely separated poles of opposite polarity to provide a magnetic field enclosing a region substantially zero field intensity in the space surrounding said pair of magnets, and means responsive to variations in magnetic field intensity disposed within said region.

11. A magnetic influence indicator comprising at least one linear array of two magnets having dielectrically separated substantially abutting ends of opposed polarity, said magnets thereby establishing a magnetic field which includes a space of substantially zero magnetic field intensity enclosed by a nonuniform magnetic field, and a magnetic field responsive device positioned within said space, whereby the relative coordinates of said space are shifted when said field configuration is distorted by the presence of magnetic field influencing materials, said shift being indicated by said device.

12. An apparatus comprising at least 3 magnetic field sources each having colinear magnets with adjacent regions of opposed polarity, all of said sources being separated by a dielectric substance, said sources creating a magnetic field configuration which includes spaces of substantially zero magnetic field intensity, and detectors positioned in said spaces, said detectors being responsive to distortions of said magnetic field, said distortions resulting from external influence.

References Cited in the file of this patent

UNITED STATES PATENTS

| 2,123,045 | Hoare | July 5, 1938 |
| 2,431,319 | Ellwood | Nov. 25, 1947 |
| 2,451,596 | Wheeler | Oct. 19, 1948 |